(12) United States Patent
Horacek et al.

(10) Patent No.: US 8,125,768 B2
(45) Date of Patent: Feb. 28, 2012

(54) EXTERNAL COATING FOR A SOLID ELECTROLYTIC CAPACITOR

(75) Inventors: Ivan Horacek, Lanskroun (CZ); Jan Petrzilek, Usti nad Orlici (CZ)

(73) Assignee: AVX Corporation, Myrtle Beach, SC (US)

( * ) Notice: Subject to any disclaimer, the term of this patent is extended or adjusted under 35 U.S.C. 154(b) by 5 days.

(21) Appl. No.: 12/604,633

(22) Filed: Oct. 23, 2009

(65) Prior Publication Data

US 2011/0096466 A1     Apr. 28, 2011

(51) Int. Cl.
*H01G 9/04* (2006.01)
*H01G 9/145* (2006.01)

(52) U.S. Cl. ........................ 361/532; 361/528

(58) Field of Classification Search .......... 361/523, 361/528, 532–534
See application file for complete search history.

(56) References Cited

U.S. PATENT DOCUMENTS

| | | | |
|---|---|---|---|
| 3,345,545 A | 10/1967 | Bourgault et al. | |
| 4,910,645 A | 3/1990 | Jonas et al. | |
| 4,959,430 A | 9/1990 | Jonas et al. | |
| 5,300,575 A | 4/1994 | Jonas et al. | |
| 5,457,862 A | 10/1995 | Sakata et al. | |
| 5,473,503 A | 12/1995 | Sakata et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,322,912 B1 | 11/2001 | Fife | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,527,937 B2 | 3/2003 | Fife | |
| 6,528,662 B2 | 3/2003 | Jonas | |
| 6,576,099 B2 | 6/2003 | Kimmel et al. | |
| 6,580,601 B2 * | 6/2003 | Hamada et al. | 361/523 |
| 6,592,740 B2 | 7/2003 | Fife | |
| 6,639,787 B2 | 10/2003 | Kimmel et al. | |
| 6,674,635 B1 | 1/2004 | Fife et al. | |
| 6,756,473 B2 | 6/2004 | Reuter et al. | |

(Continued)

FOREIGN PATENT DOCUMENTS

EP             0895259 A2      2/1999

(Continued)

OTHER PUBLICATIONS

Search Report for GB1016153.7 dated Feb. 2, 2011, 4 pages.

*Primary Examiner* — Eric Thomas
(74) *Attorney, Agent, or Firm* — Dority & Manning, P.A.

(57) ABSTRACT

A solid electrolytic capacitor that includes an anode body, a dielectric overlying the anode body, a solid electrolyte that contains one or more conductive polymers and overlies the dielectric, and an external coating that overlies the solid electrolyte, is provided. The external coating includes at least one carbonaceous layer (e.g., graphite) and at least one metal layer (e.g., silver). In addition to the aforementioned layers, the external coating also includes at least one conductive polymer layer that is disposed between the carbonaceous and metal layers. Among other things, such a conductive polymer layer can reduce the likelihood that the carbonaceous layer will delaminate from the solid electrolyte during use. This can increase the mechanical robustness of the part and improve its electrical performance.

25 Claims, 1 Drawing Sheet

U.S. PATENT DOCUMENTS

| | | |
|---|---|---|
| 6,798,644 B1 * | 9/2004 | Piller et al. .............. 361/528 |
| 6,864,147 B1 | 3/2005 | Fife et al. |
| 6,891,016 B2 | 5/2005 | Reuter et al. |
| 6,987,663 B2 | 1/2006 | Merker et al. |
| 7,102,016 B2 | 9/2006 | Reuter |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,220,397 B2 | 5/2007 | Kimmel et al. |
| 7,262,511 B2 | 8/2007 | Osako et al. |
| 7,279,015 B2 | 10/2007 | Merker |
| 7,341,705 B2 | 3/2008 | Schnitter |
| 7,341,801 B2 | 3/2008 | Reuter et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,460,358 B2 | 12/2008 | Biler |
| 7,468,882 B2 | 12/2008 | Maret et al. |
| 7,483,259 B2 | 1/2009 | Biler |
| 7,515,396 B2 | 4/2009 | Biler |
| 7,563,290 B2 | 7/2009 | Qiu et al. |
| 2001/0003501 A1 * | 6/2001 | Hayashi et al. .............. 361/523 |
| 2002/0097550 A1 * | 7/2002 | Shimada et al. .............. 361/532 |
| 2006/0180797 A1 | 8/2006 | Merker et al. |
| 2007/0064376 A1 | 3/2007 | Merker et al. |
| 2008/0005878 A1 | 1/2008 | Merker et al. |
| 2009/0030149 A1 | 1/2009 | Morita et al. |
| 2009/0166211 A1 | 7/2009 | Biler |
| 2010/0053848 A1 | 3/2010 | Kikuchi et al. |

FOREIGN PATENT DOCUMENTS

| | | |
|---|---|---|
| EP | 0895259 A3 | 2/1999 |
| EP | 1100097 A1 | 5/2011 |
| JP | 2000232036 A * | 8/2000 |
| JP | 2006295184 A * | 10/2006 |
| JP | 2008235771 A | 10/2008 |
| WO | WO 2009030615 A1 | 3/2009 |
| WO | WO 2009043648 A1 | 4/2009 |
| WO | WO 2009047059 A1 | 4/2009 |

* cited by examiner

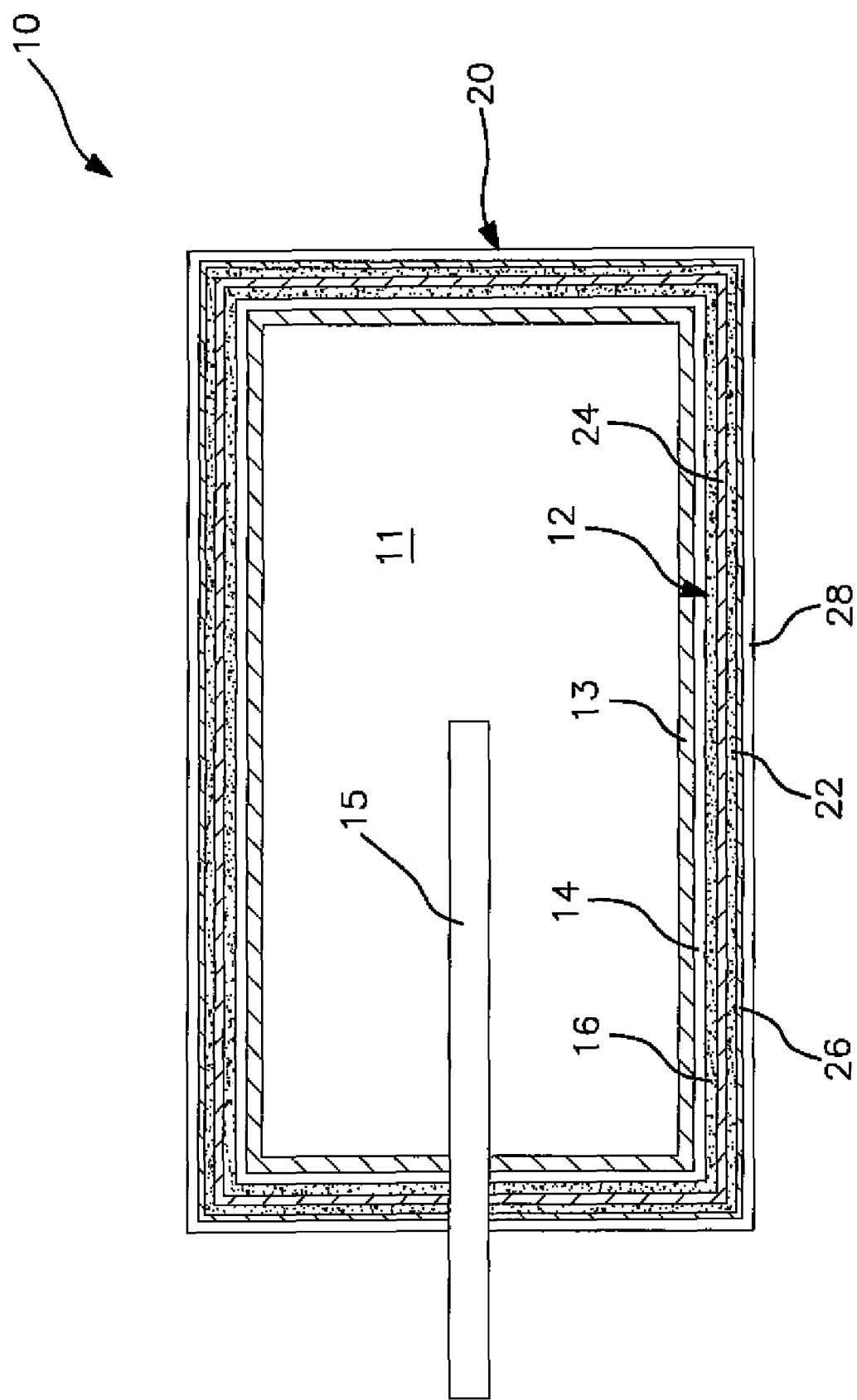

EXTERNAL COATING FOR A SOLID ELECTROLYTIC CAPACITOR

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around a metal lead wire, sintering the pressed part, anodizing the sintered anode, and thereafter applying a solid electrolyte. The solid electrolyte layer may be formed from a conductive polymer (e.g., poly(3,4-ethylenedioxythiophene)), such as described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al. The conductive polymer electrolyte of these capacitors has traditionally been formed through sequential dipping into separate solutions containing the ingredients of the polymer layer. For example, the monomer used to form the conductive polymer is often applied in one solution, while the catalyst and dopant is applied in a separate solution or solutions. One problem with this technique, however, is that it is often difficult and costly to achieve a relatively thick solid electrolyte, which is helpful for achieving good mechanical robustness and electrical performance. Various attempts have been made to address this problem. U.S. Pat. No. 6,987,663 to Merker, et al., for instance, describes the use of a polymeric outer layer that covers a surface of the solid electrolyte. Unfortunately, this technique is still problematic in that it is difficult to achieve good adhesion and mechanical robustness of the polymeric outer layer to the graphite/silver layer used in terminating the solid electrolyte capacitor.

As such, a need remains for a solid electrolytic capacitor that possesses good mechanical robustness and electrical performance.

SUMMARY OF THE INVENTION

In accordance with one embodiment of the present invention, a solid electrolytic capacitor is disclosed that comprises an anode body, a dielectric overlying the anode body, a solid electrolyte overlying the dielectric, and an external coating that overlies the solid electrolyte. The solid electrolyte contains a first conductive polymer layer. The external coating contains a carbonaceous layer and a metal layer that overlies the carbonaceous layer. The external coating further contains a second conductive polymer layer that is positioned between the carbonaceous layer and the metal layer.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying FIGURE, in which:

FIG. 1 is a cross-sectional view of one embodiment of the solid electrolytic capacitor of the present invention.

Repeat use of reference characters in the present specification and drawing is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor that includes an anode body, a dielectric overlying the anode body, a solid electrolyte that contains one or more conductive polymers and overlies the dielectric, and an external coating that overlies the solid electrolyte. The external coating includes at least one carbonaceous layer (e.g., graphite) and at least one metal layer (e.g., silver). In addition to the aforementioned layers, the external coating also includes at least one conductive polymer layer that is disposed between the carbonaceous and metal layers. Among other things, such a conductive polymer layer can reduce the likelihood that the carbonaceous layer will delaminate from the solid electrolyte during use. This can increase the mechanical robustness of the part and improve its electrical performance.

Various embodiments of the present invention will now be described in more detail.

I. Anode Body

The anode body may be formed from a valve metal composition having a high specific charge, such as about 40,000 µF*V/g or more, in some embodiments about 50,000 µF*V/g or more, in some embodiments about 60,000 µF*V/g or more, and in some embodiments, from about 70,000 to about 700,000 µF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 m²/g, in some embodiments from about 0.5 to about 5.0 m²/g, and in some embodiments, from about 1.0 to about 2.0 m²/g. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 g/cm³, in some embodiments from about 0.2 to about 4.0 g/cm³, and in some embodiments, from about 0.5 to about 3.0 g/cm³.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

If desired, an anode lead may also be attached to the anode body. The anode lead may be in the form of a wire, sheet, etc., and may be formed from a valve metal compound, such as tantalum, niobium, niobium oxide, etc. Attachment of the lead may be accomplished using known techniques, such as by welding the lead to the body or embedding it within the anode body during formation.

II. Dielectric

The anode body may be anodized so that a dielectric is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

III. Solid Electrolyte

The solid electrolyte overlies the dielectric and is generally formed from one or more conductive polymer layers. The conductive polymer(s) employed in such layers are typically π-conjugated and have electrical conductivity after oxidation or reduction, such as an electrical conductivity of at least about 1 µS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly (3,4-ethylenedioxythiophene) ("PEDT"). In one particular embodiment, a polythiophene derivative is employed with recurring units of general formula (I) or formula (II) or recurring units of general formulae (I) and (II):

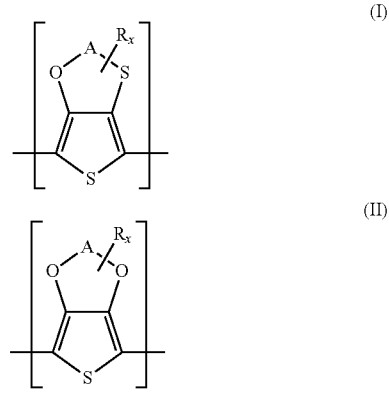

(I)

(II)

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable polythiophene derivatives are those in which "A" is an optionally substituted $C_2$ to $C_3$ alkylene radical and x is 0 or 1. In one particular embodiment, the polythiophene derivative is PEDT and has recurring units of formula (II), wherein "A" is $CH_2-CH_2$ and "x" is 0. Methods for forming such polythiophene derivatives are well known in the art and described, for instance, in U.S. Pat. No. 6,987,663 to Merker, et al., which is incorporated herein in its entirety by reference thereto for all purposes. For example, the polythiophene derivatives may be formed from a monomeric precursor, such as optionally substituted thiophenes. Particularly suitable monomeric precursors are substituted 3,4-alkylenedioxythiophenes having the general formula (III), (IV) or a mixture of thiophene of general formulae (III) and (IV):

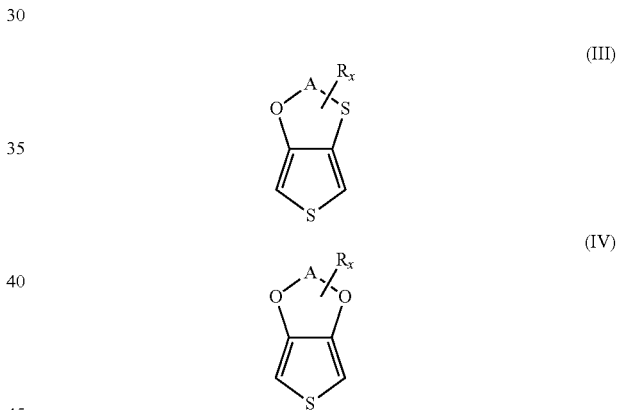

(III)

(IV)

wherein, A, R, and X are as defined above.

Examples of such monomeric precursors include, for instance, optionally substituted 3,4-ethylenedioxythiophenes. Derivatives of these monomeric precursors may also be employed that are, for example, dimers or trimers of the above monomeric precursors. Higher molecular derivatives, i.e., tetramers, pentamers, etc. of the monomeric precursors are suitable for use in the present invention. The derivatives may be made up of identical or different monomer units and used in pure form and in a mixture with one another and/or with the monomeric precursors. Oxidized or reduced forms of these precursors may also be employed.

To produce the desired conductive polymer, monomeric precursors, such as described above, typically undergo oxidative polymerization in the presence of an oxidizing agent. The oxidizing agent may be a transition metal salt, such as a salt of an inorganic or organic acid that contain iron(III), copper(II), chromium(VI), cerium(IV), manganese(IV), manganese(VII), or ruthenium(III) cations. Particularly suitable transition metal salts include iron(III) cations, such as iron(III) halides (e.g., $FeCl_3$) or iron(III) salts of other inorganic acids, such as Fe(ClO4)$_3$ or Fe$_2$(SO$_4$)$_3$ and the iron(III) salts of organic acids and inorganic acids comprising organic radicals. Examples of iron (III) salts of inorganic acids with organic radicals include, for instance, iron(III) salts of sulfuric acid monoesters of C$_1$ to C$_{20}$ alkanols (e.g., iron(III) salt of lauryl sulfate). Likewise, examples of iron(III) salts of organic acids include, for instance, iron(III) salts of C$_1$ to C$_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic C$_1$ to C$_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by C$_1$ to C$_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable for use in the present invention.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylenedioxy-thiophene) may initially be mixed with the oxidizing agent to form a solution. One suitable oxidizing agent is CLEVIOS™ C, which is iron III toluene-sulfonate and sold by H. C. Starck. CLEVIOS™ C is a commercially available catalyst for CLEVIOS™ M, which is 3,4-ethylene dioxythiophene, a PEDT monomer also sold by H. C. Starck. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, the solid electrolyte may also be applied to the part in the form of a dispersion of solid conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The D$_{90}$ value of the particles (particles having a diameter of less than or equal to the D$_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract a charged conductive polymer (e.g., polythiophene). That is, the conductive polymer (e.g., polythiophene or derivative thereof) used in the solid electrolyte typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of C$_1$ to C$_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic C$_1$ to C$_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by C$_1$ to C$_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in a given layer of the solid electrolyte is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), and alcohols (e.g., ethylene glycol, glycerol, di- or triethylene glycol).

The polymeric dispersion may be applied to the part using a variety of known techniques, such as by spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas. Once applied, the layer may be dried and washed.

As indicated above, the solid electrolyte may be formed from one or multiple layers. When multiple layers are employed, they may be formed from a conductive polymer that is formed in situ and/or from a polymeric dispersion. Each layer may be formed using one or more coating steps.

Referring to FIG. 1, for example, one embodiment of a capacitor 10 is shown that contains a solid electrolyte 12 formed from multiple layers. More specifically, the solid electrolyte 12 includes a first conductive polymer layer 14 that is in contact with a dielectric 13 that overlies an anode body 11 embedded with a lead 15. In one embodiment, the first layer 14 may contain a conductive polymer (e.g., PEDT) that is formed through in situ polymerization of an oxidizing agent and monomeric precursor. The solid electrolyte 12 also contains a second conductive polymer layer 16 that generally overlies the first layer 14. The second layer 16 may be formed from a dispersion of particles that contains a conductive polymer (e.g., PEDT), binder, and an optional counterion (e.g., PSS). One benefit of employing such a dispersion is that it may be able to penetrate into the edge region of the capacitor body to achieve good electrical contact with the inner layer and increase the adhesion to the capacitor body. This results in a more mechanically robust part, which may reduce equivalent series resistance and leakage current. The resulting solid electrolyte 12 typically has a total thickness of from about 1 micrometer (μm) to about 200 μm, in some embodiments from about 2 μm to about 50 μm, and in some embodiments, from about 5 μm to about 30 μm. For instance, the inner layer 14 may have a total thickness of from about 0.1 μm to about 100 μm, in some embodiments from about 0.5 μm to about 20 μm, and in some embodiments, from about 1 μm to about 5 μm, while the outer layer 16 may have a total thickness of from about 0.2 μm to about 100 μm, in some embodiments from about 1 μm to about 40 μm, and in some embodiments, from about 3 μm to about 10 μm.

Regardless of the particular manner in which it is formed, the solid electrolyte may be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

IV. External Coating

The capacitor of the present invention also contains an external coating that overlies the solid electrolyte. The external coating contains at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

In addition to the layers noted above, the external coating also contains at least one polymer layer that is positioned between the metal and carbonaceous layers. Among other things, this layer helps to inhibit delamination of the carbonaceous layer from the anode part. The thickness of the layer typically ranges from about 0.1 μm to about 30 μm, in some embodiments from about 0.2 μm to about 20 μm, in some embodiments from about 0.5 μm to about 5 μm, and in some embodiments, from about 1 μm to about 3 μm. To optimize the electrical performance of the capacitor, the polymer layer is generally conductive in nature, For example, the layer typically has a specific conductivity, in the dry state, of about 1 Siemen per centimeter ("S/cm") or more, in some embodiments about 10 S/cm or more, in some embodiments about 20 S/cm or more, and in some embodiments, from about 50 to about 500 S/cm. Such conductivity is imparted through the use of a conductive polymer, such as the r-conjugated conductive polymers described above, e.g., polyheterocycles (e.g., polypyrroles, polythiophenes, polyanilines, etc.), polyacetylenes, poly-p-phenylenes, polyphenolates, and so forth. Particularly suitable polythiophenes include, for instance, polythiophene and derivatives thereof, such as poly(3,4-ethylenedioxythiophene) ("PEDT").

The conductive polymer layer may be formed through in situ polymerization, dispersions, etc., in the manner described above. In one embodiment, for example, the layer contains a conductive polymer (e.g., PEDT) formed through in situ polymerization of an oxidizing agent and monomeric precursor. In another embodiment, the conductive polymer layer is formed from a dispersion of conductive polymer particles. The particles may have an average diameter of from about 1 to about 500 nanometers (nm), in some embodiments from about 5 to about 400 nanometers, and in some embodiments, from about 10 to about 300 nanometers. The $D_{90}$ value of the particles may be about 15 μm or less, in some embodiments about 10 micrometers or less, and in some embodiments, from about 1 nm to about 8 μm. A counterion (e.g., polystyrene sulfonic acid) may also be employed as described above to assist in the formation of the particles. The weight ratio of such counterions to conductive polymers may be from about 0.5:1 to about 50:1, in some embodiments from about 1:1 to about 30:1, and in some embodiments, from about 2:1 to about 20:1. In addition to conductive polymer(s) and optional counterion(s), the dispersion may also contain other components as described above. For instance, binders may be employed to enhance the adhesive nature of the layer and increase stability. Typically, however, the conductive polymers constitute from about 0.1 wt. % to about 20 wt. %, in some embodiments from about 0.5 wt. % to about 10 wt. %, and in some embodiments, from about 1 wt. % to about 5 wt. % of the dispersion. Other ingredients may also be employed as described above, such as dispersion agents (e.g., water), fillers, surface-active substances, adhesives, additives that increase conductivity, and so forth.

Still other layers may also be employed in the external coating. For example, if desired, an additional carbonaceous layer may be employed between the conductive polymer dispersion and the metal layer. In this manner, the dispersion is sandwiched between carbonaceous layers. Such an additional carbonaceous layer may help further reduce the likelihood that any metal will inadvertently contact the solid electrolyte of the capacitor. When employed, such an additional layer may have a thickness of from about 1 μm to about 50 μm, in some embodiments from about 2 μm to about 20 μm, and in some embodiments, from about 5 μm to about 10 μm.

Referring again to FIG. 1, one particular embodiment of an external coating 20 is shown that contains a conductive polymer layer sandwiched between multiple carbonaceous layers. More specifically, the external coating 20 includes a conductive polymer layer 22 positioned between and in contact with a first carbonaceous layer 24 and a second carbonaceous layer 26. In one embodiment, the layer 22 is formed through in situ polymerization of an oxidizing agent and monomeric precursor. In another embodiment, the layer 22 is formed from a dispersion of particles that contains a conductive polymer (e.g., PEDT) and an optional counterion (e.g., PSS). The first carbonaceous layer 24 overlies and is contact with the solid electrolyte 12 of the capacitor 10. Furthermore, the external coating 20 also include a metal layer 28 (e.g., silver) that overlies and is in contact with the second carbonaceous layer 26. In this particular embodiment, the metal layer 28 defines an external surface of the capacitor 10. Typically, the resulting external coating 20 has a total thickness of from about 5 μm to about 300 μm, in some embodiments from about 10 μm to about 100 μm, and in some embodiments, from about 20 μm to about 50 μm.

The electrolytic capacitor of the present invention may also contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osaka, et al., which is incorporated herein in its entirety by reference thereto for all purposes.

Once the capacitor element is attached, the lead frame may be enclosed within a casing, which may then be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element is encapsulated so that at least a portion of the anode and cathode terminations are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

The present invention may be better understood by reference to the following examples.

Test Procedures

Equivalent Series Resistance (ESR), Capacitance, and Dissipation Factor:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 2 volts bias and 1 volt signal, The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

EXAMPLE 1

70,000 μFV/g tantalum powder was used to form various anode samples. Each anode sample was embedded with a tantalum wire, sintered at 1300° C., and pressed to a density of 5.3 g/cm³. The resulting pellets had a size of 1.65×2.70×2.85 mm. The pellets were anodized in a phosphoric acid electrolyte in water at a temperature of 85° C. and subsequently shell formed in water/ethylene glycol electrolyte to form the dielectric layer. The samples were then dipped sequentially into a solution of iron(III) p-toluenesulfonate solution in n-butanol (CLEVIOS CB40, H. C. Starck) and into a solution of 3,4-ethylenedioxythiophene (CLEVIOS M, Starck), and thereafter in-situ polymerized to form a PEDT layer. The parts were then dipped into a PEDT/PSS polymeric dispersion (CLEVIOS K, H. C. Starck), polymerized, and dried to form an additional PEDT layer.

Upon formation of the solid electrolyte, the parts were dipped into a graphite dispersion (DuPont) and dried. Next, the parts were dipped sequentially into a solution of iron(III) p-toluenesulfonate solution in n-butanol (CLEVIOS CB40, H. C. Starck) and into a solution of 3,4-ethylenedioxythiophene (CLEVIOS M, H. C. Starck), and thereafter in-situ polymerized. The parts were then dipped once more into a graphite dispersion (DuPont) and dried. Finally, the parts were dipped into a silver dispersion (Lord) and dried. The finished parts were completed by conventional assembly technology.

EXAMPLE 2

Tantalum anode samples were formed and anodized as described above in Example 1. The samples were then dipped sequentially into a solution of iron(III) p-toluenesulfonate solution in n-butanol (CLEVIOS CB40, H. C. Starck) and into a solution of 3,4-ethylenedioxythiophene (CLEVIOS M, H. C. Starck), and thereafter in-situ polymerized to form a PEDT layer. The parts were then dipped into a PEDT/PSS polymeric dispersion (CLEVIOS K, H. C. Starck), polymerized, and dried to form an additional PEDT layer. Upon formation of the solid electrolyte, the parts were dipped into a graphite dispersion (DuPont) and dried. Next, the parts were dipped into a PEDT/PSS polymeric dispersion (CLEVIOS K, H. C. Starck) and polymerized. The parts were then dipped once more into a graphite dispersion (DuPont) and dried. Finally, the parts were dipped into a silver dispersion (Lord) and dried. The finished parts were completed by conventional assembly technology.

Comparative Example

Tantalum anode samples were formed and anodized as described above in Example 1. The samples were then dipped sequentially into a solution of iron(III) p-toluenesulfonate solution in n-butanol (CLEVIOS CB40, H. C. Starck) and into a solution of 3,4-ethylenedioxythiophene (CLEVIOS M, H. C. Starck), and thereafter in-situ polymerized to form a PEDT layer. The parts were then dipped into a PEDT/PSS polymeric dispersion (CLEVIOS K, H. C. Starck), polymerized, and dried to form an additional PEDT layer. Upon formation of the solid electrolyte, the parts were dipped into a graphite dispersion (DuPont) and dried. Next, the parts were dipped into a silver dispersion (Lord) and dried. The finished parts were completed by conventional assembly technology.

The parts made in the aforementioned Examples were then tested for electrical performance (i.e., leakage current ("DCL"), capacitance, dissipation factor ("Df"), and equivalent series resistance ("ESR"). The results are set forth below.

| Example No. | Mean Anode dimension (mm) | | Median Electrical Properties | | | |
| | Width | Thick | DCL [μA] | CAP [μF] | Df | ESR [ ] |
| --- | --- | --- | --- | --- | --- | --- |
| 1 | 2.533 | 1.452 | 3.03 | 145.47 | 0.022 | 0.050 |
| 2 | 2.534 | 1.452 | 2.98 | 145.47 | 0.022 | 0.050 |
| Comparative | 2.530 | 1.478 | 8.83 | 145.65 | 0.021 | 0.046 |

As indicated, the leakage current for Examples 1 and 2 was significantly better than that of the Comparative Example.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
an anode body that is the form of a pressed and sintered pellet;
a dielectric overlying the anode body;
a solid electrolyte overlying the dielectric, wherein the solid electrolyte contains a first conductive polymer layer that is adjacent to and in direct contact with the dielectric; and
an external coating that overlies the solid electrolyte and contains a carbonaceous layer and a metal layer that overlies the carbonaceous layer, wherein the external coating further contains a second conductive polymer layer that is positioned between the carbonaceous layer and the metal layer, wherein the external coating comprises an additional carbonaceous layer that is positioned between the second conductive polymer layer and the metal layer.

2. The solid electrolytic capacitor of claim 1, wherein the first conductive polymer layer, the second conductive polymer layer, or both contain a polypyrrole, polythiophene, polyaniline, polyacetylene, poly-p-phenylene, polyphenolate, or a combination thereof.

3. The solid electrolytic capacitor of claim 2, wherein the first conductive polymer layer, the second conductive polymer layer, or both contain a polythiophene derivative having recurring units of general formula (I) or formula (II) or recurring units of general formulae (I) and (II):

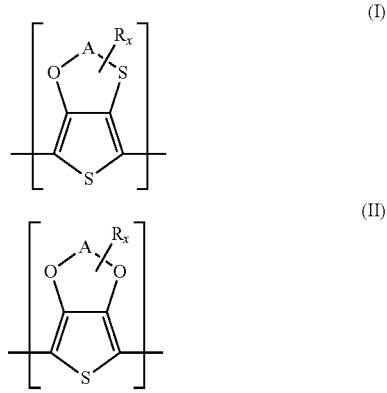

wherein,
A is an optionally substituted $C_1$ to $C_5$ alkylene radical;
R is a linear or branched, optionally substituted $C_1$ to $C_{18}$ alkyl radical; optionally substituted $C_5$ to $C_{12}$ cycloalkyl radical; optionally substituted $C_6$ to $C_{14}$ aryl radical; optionally substituted $C_7$ to $C_{18}$ aralkyl radical; optionally substituted $C_1$ to $C_4$ hydroxyalkyl radical, or hydroxyl radical; and
x is an integer from 0 to 8.

4. The solid electrolytic capacitor of claim 3, wherein A is an optionally substituted $C_2$ to $C_3$ alkylene radical and x is 0 or 1.

5. The solid electrolytic capacitor of claim 3, wherein the polythiophene derivative is poly(3,4-ethylenedioxythiophene).

6. The solid electrolytic capacitor of claim 1, wherein the solid electrolyte further contains a third conductive polymer layer, wherein the first conductive polymer layer overlies the dielectric and the third conductive polymer layer overlies the first conductive polymer layer.

7. The solid electrolytic capacitor of claim 6, wherein third conductive polymer layer is formed from a dispersion of conductive polymer particles.

8. The solid electrolytic capacitor of claim 7, wherein the first conductive polymer layer is formed from polymerization of a monomeric precursor and oxidizing agent.

9. The solid electrolytic capacitor of claim 8, wherein the first conductive polymer layer, the second conductive polymer layer, and the third conductive polymer layer contain polythiophene or a derivative thereof.

10. The solid electrolytic capacitor of claim 9, wherein the polythiophene derivative is poly(3,4-ethylenedioxythiophene).

11. The solid electrolytic capacitor of claim 8, wherein the carbonaceous layer contains graphite and the metal layer contains silver.

12. The solid electrolytic capacitor of claim 8, wherein the second conductive polymer layer is formed from polymerization of a monomeric precursor and oxidizing agent.

13. The solid electrolytic capacitor of claim 1, wherein the carbonaceous layer contains graphite.

14. The solid electrolytic capacitor of claim 1, wherein the metal layer contains silver.

15. The solid electrolytic capacitor of claim 1, wherein the second conductive polymer layer is formed from polymerization of a monomeric precursor and oxidizing agent.

16. The solid electrolytic capacitor of claim 1, wherein the second conductive polymer layer is formed from a dispersion of conductive polymer particles.

17. The solid electrolytic capacitor of claim 16, wherein the particles have an average diameter of from about 1 to about 500 nanometers.

18. The solid electrolytic capacitor of claim 16, wherein the particles have an average diameter of from about 10 to about 300 nanometers.

19. The solid electrolytic capacitor of claim 16, wherein the dispersion contains a polymeric anion.

20. The solid electrolytic capacitor of claim 16, wherein the polymeric anion is polystyrene sulfonic acid.

21. The solid electrolytic capacitor of claim 1, wherein the second conductive polymer layer has a thickness of from about 0.2 μm to about 20 μm.

22. The solid electrolytic capacitor of claim 1, wherein the external coating has a total thickness of from about 5 μm to about 300 μm.

23. The solid electrolytic capacitor of claim 1, wherein the anode body includes tantalum, niobium, or an electrically conductive oxide thereof.

24. The solid electrolytic capacitor of claim 23, wherein the anode body includes tantalum and the dielectric include tantalum pentoxide.

25. The solid electrolytic capacitor of claim 23, wherein the anode body includes niobium oxide and the dielectric include niobium pentoxide.

* * * * *